(12) United States Patent
Takatsukasa

(10) Patent No.: US 10,097,343 B2
(45) Date of Patent: Oct. 9, 2018

(54) DATA PROCESSING APPARATUS AND DATA PROCESSING METHOD

(71) Applicant: FUJI ELECTRIC CO., LTD., Kanagawa (JP)

(72) Inventor: Kenji Takatsukasa, Tokyo (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/439,147

(22) Filed: Feb. 22, 2017

(65) Prior Publication Data

US 2017/0272238 A1    Sep. 21, 2017

(30) Foreign Application Priority Data

Mar. 17, 2016    (JP) ................. 2016-053737

(51) Int. Cl.
H04L 29/06    (2006.01)
H04L 9/06    (2006.01)
G09C 1/00    (2006.01)

(52) U.S. Cl.
CPC .............. *H04L 9/0631* (2013.01); *G09C 1/00* (2013.01); *H04L 2209/12* (2013.01)

(58) Field of Classification Search
None
See application file for complete search history.

(56) References Cited

U.S. PATENT DOCUMENTS

| | | | | |
|---|---|---|---|---|
| 5,592,553 | A * | 1/1997 | Guski | H04L 9/3228 380/29 |
| 6,182,216 | B1 * | 1/2001 | Luyster | H04L 9/002 380/28 |
| 7,236,593 | B2 * | 6/2007 | Lu | H04L 9/0631 380/259 |
| 7,639,800 | B2 * | 12/2009 | Kasuya | G09C 1/00 380/29 |

(Continued)

FOREIGN PATENT DOCUMENTS

JP    2012-520589    9/2012

OTHER PUBLICATIONS

S. Chow et al., "White-Box Cryptography and an AES Implementation", In 9th Annual Workshop on Selected Areas in Cryptography (SAC 2002), Aug. 15-16, 2002, pp. 1-18.

(Continued)

*Primary Examiner* — Maung T Lwin
(74) *Attorney, Agent, or Firm* — IPUSA, PLLC

(57) ABSTRACT

A data processing apparatus that encrypts or decrypts data by Advanced Encryption Standard in which a plurality of key data are respectively prepared for a plurality of round processes that are performed in order, includes a selector that selects sub-round data of 4 bytes from input data that is a process target of a first round process; a converter that converts each data of 1 byte of the sub-round data, based on a first table by which a result same as performing a predetermined process is output, to generate converted data of 4 bytes; and an exclusive OR calculator that calculates exclu- (Continued)

sive OR of the converted data of the sub-round data, respectively, the predetermined process including an encryption process or a decryption process using at least a part of key data prepared for a second round process which is performed later than the first round process.

14 Claims, 14 Drawing Sheets

(56) References Cited

U.S. PATENT DOCUMENTS

| | | | | |
|---|---|---|---|---|
| 8,054,967 B2* | 11/2011 | Nonaka | ................ | H04L 9/0631 380/28 |
| 8,218,762 B2* | 7/2012 | Itoh | ................ | H04L 9/003 380/28 |
| 8,379,843 B2* | 2/2013 | Shirai | ................ | H04L 9/28 380/28 |
| 8,594,330 B2* | 11/2013 | Doumen | ................ | H04N 7/163 380/255 |
| 8,787,563 B2* | 7/2014 | Shirai | ................ | H04L 9/0643 380/28 |
| 8,838,997 B2* | 9/2014 | Wolrich | ................ | G09C 1/00 380/28 |
| 2003/0099352 A1* | 5/2003 | Lu | ................ | H04L 9/0631 380/37 |
| 2004/0202318 A1* | 10/2004 | Lu | ................ | H04L 9/0631 380/29 |
| 2008/0285745 A1* | 11/2008 | Teglia | ................ | H04L 9/003 380/29 |
| 2011/0055591 A1* | 3/2011 | Rivain | ................ | H04L 9/003 713/189 |
| 2012/0002807 A1 | 1/2012 | Michiels et al. | | |

OTHER PUBLICATIONS

James A. Muir., "A Tutorial on White-box AES", Advances in Network Analysis and its Applications, Mathematics in Industry 18 (2013), pp. 1-25.

Olivier Billet et al., "Cryptanalysis of a White Box AES Implementation", Selected Areas in Cryptography: 11th International Workshop, SAC 2004, pp. 227-240.

* cited by examiner

FIG.13

|  | PER ROUND | 128 bits | 192 bits | 256 bits |
|---|---|---|---|---|
| 1ST STEP | 16 | 144 | 176 | 208 |
| 2ND, 3RD STEP | 12 | 108 | 132 | 156 |
| 4TH STEP | 4 | 36 | 44 | 52 |
| (FINAL ROUND) |  | 4 | 4 | 4 |
| TOTAL |  | 292 | 356 | 420 |

(kByte)

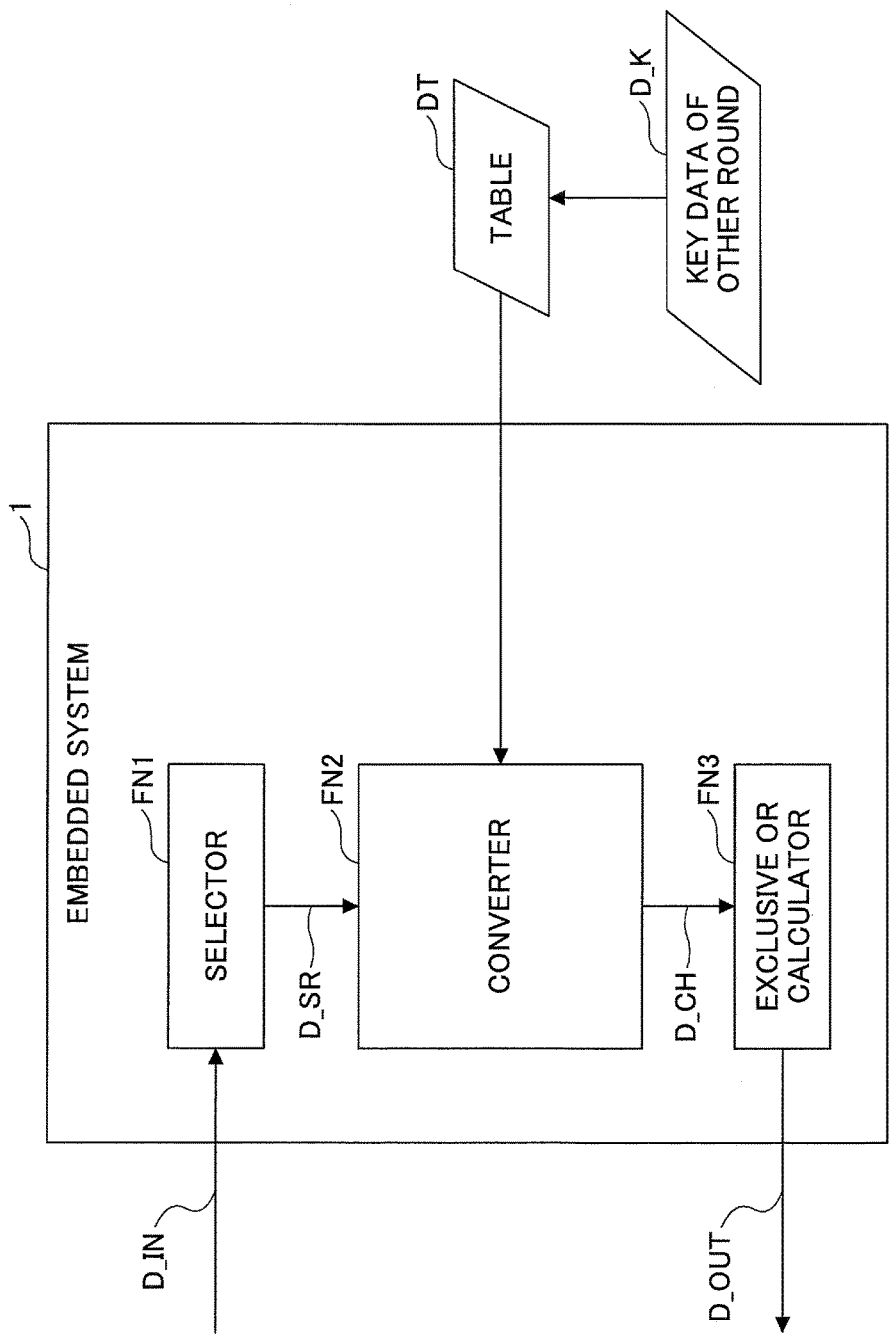

DATA PROCESSING APPARATUS AND DATA PROCESSING METHOD

CROSS-REFERENCE TO RELATED APPLICATION

The present application is based on and claims the benefit of priority of Japanese Priority Application No. 2016-053737 filed on Mar. 17, 2016, the entire contents of which are hereby incorporated by reference.

BACKGROUND OF THE INVENTION

1. Field of the Invention

The present invention relates to a data processing apparatus and a data processing method.

2. Description of the Related Art

As a conventional method of encryption and decryption of data, Advanced Encryption Standard (AES), specified by Federal Information Processing Standard (FIPS) 197 (National Institute of Standards and Technology (NIST), issued in 2001), is known.

Further, as a method to improve security in AES, White-Box Cryptography is known (Non-Patent Document 1, Non-Patent Document 2 and the like, for example).

Further, a White-Box Cryptography system with input dependent encodings is known. Specifically, the system includes a network of a plurality of basic blocks arranged for collectively performing a cryptographic operation. An encoder is arranged for encoding output data of a first one of the plurality of basic blocks into an encoder-output according to a selected one of a plurality of encoding schemes, the selection depending on an input-message to the system. A compensator is arranged for recoding intermediate data to compensate for the effect of the encoding according to a selected one of a plurality of recoding schemes. Using variable encodings instead of fixed encodings complicates reverse engineering the white-box cryptographic system. (Patent Document 1 or the like, for example).

However, according to the conventional methods, data may be decrypted if a method is used such as analyzing the data based on a relationship between input and output in AES, and the data is not sufficiently made difficult to be decrypted.

Non-Patent Documents

[Non-Patent Document 1] "White-Box Cryptography and an AES Implementation", S. Chow, P. Eisen, H. Johnson, P. C. van Oorschot. In 9th Annual Workshop on Selected Areas in Cryptography (SAC 2002), Aug. 15-16 2002.

[Non-Patent Document 2] "A Tutorial on White-box AES" James A. Muir. Advances in Network Analysis and its Applications, Mathematics in Industry 18 (2013), 1-25.

Patent Document

[Patent Document 1] Japanese Translation of PCT International Application Publication No. 2012-520589

SUMMARY OF THE INVENTION

The present invention is made in light of the above problems, and provides a technique to make data difficult to be decrypted in AES.

According to an embodiment, there is provided a data processing apparatus that encrypts or decrypts data by AES in which a plurality of key data are respectively prepared for a plurality of round processes that are performed in order, including a selector that selects sub-round data of 4 bytes from input data that is a process target of a first round process; a converter that converts each data of 1 byte of the sub-round data, based on a first table by which a result same as performing a predetermined process is output, to generate converted data of 4 bytes; and an exclusive OR calculator that calculates exclusive OR of the converted data of the sub-round data, respectively, the predetermined process including an encryption process or a decryption process using at least a part of key data prepared for a second round process which is performed later than the first round process.

According to another embodiment, there is provided a data processing method performed by a data processing apparatus that encrypts or decrypts data by AES in which a plurality of key data are respectively prepared for a plurality of round processes that are performed in order, including selecting sub-round data of 4 bytes from input data that is a process target of a first round process; converting each data of 1 byte of the sub-round data, based on a first table by which a result same as performing a predetermined process is output, to generate converted data of 4 bytes; and calculating exclusive OR of the converted data of the sub-round data, respectively, the predetermined process including an encryption process or a decryption process using at least a part of key data prepared for a second round process which is performed later than the first round process.

BRIEF DESCRIPTION OF THE DRAWINGS

Other objects, features and advantages of the present invention will become more apparent from the following detailed description when read in conjunction with the accompanying drawings.

FIG. 13 is a table illustrating an example of data capacity of an LUT of the comparative example;

FIG. 14 is a functional block diagram illustrating an example of a functional structure of the embedded system of the embodiment.

DETAILED DESCRIPTION OF THE PREFERRED EMBODIMENTS

Figure 1:
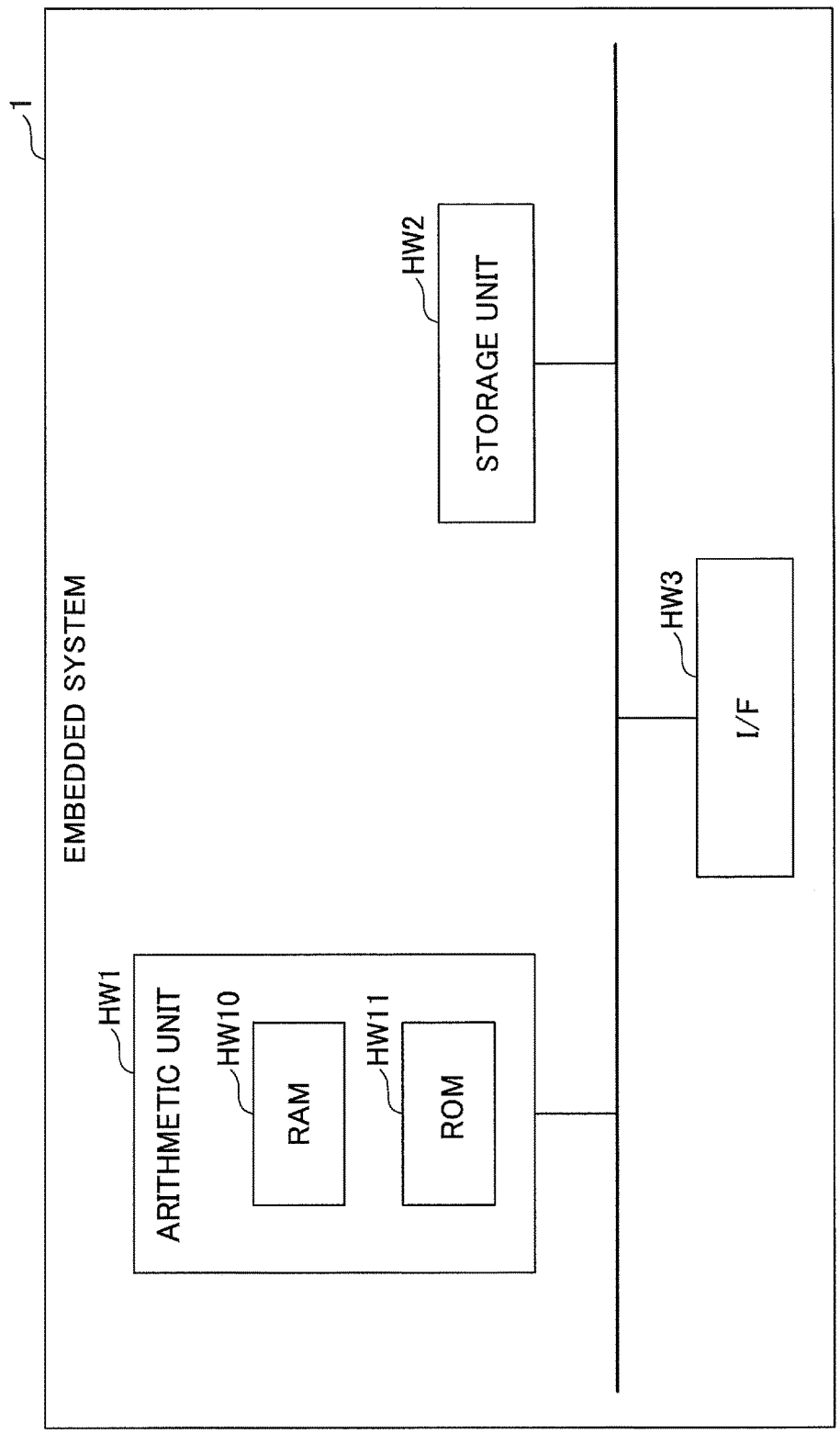
FIG. 1 is a block diagram illustrating an example of a hardware structure of an embedded system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

A data processing apparatus is an embedded system, for example. The embedded system is included in an industrial apparatus, a home electric apparatus or the like for actualizing a specific function. The data processing apparatus may be a Personal Computer (PC) or the like. Hereinafter, an example in which the data processing apparatus is the embedded system is described with reference to drawings.

Before describing an embedded system of an embodiment, a principle of White-Box Cryptography is described. There are Black-Box approaches that make an access to a key difficult in an encryption process, and White-Box approaches that make recognition of the key difficult even when the key is accessed in the encryption process are known in AES. The White-Box Cryptography is one of the White-Box approaches.

Figure 9:
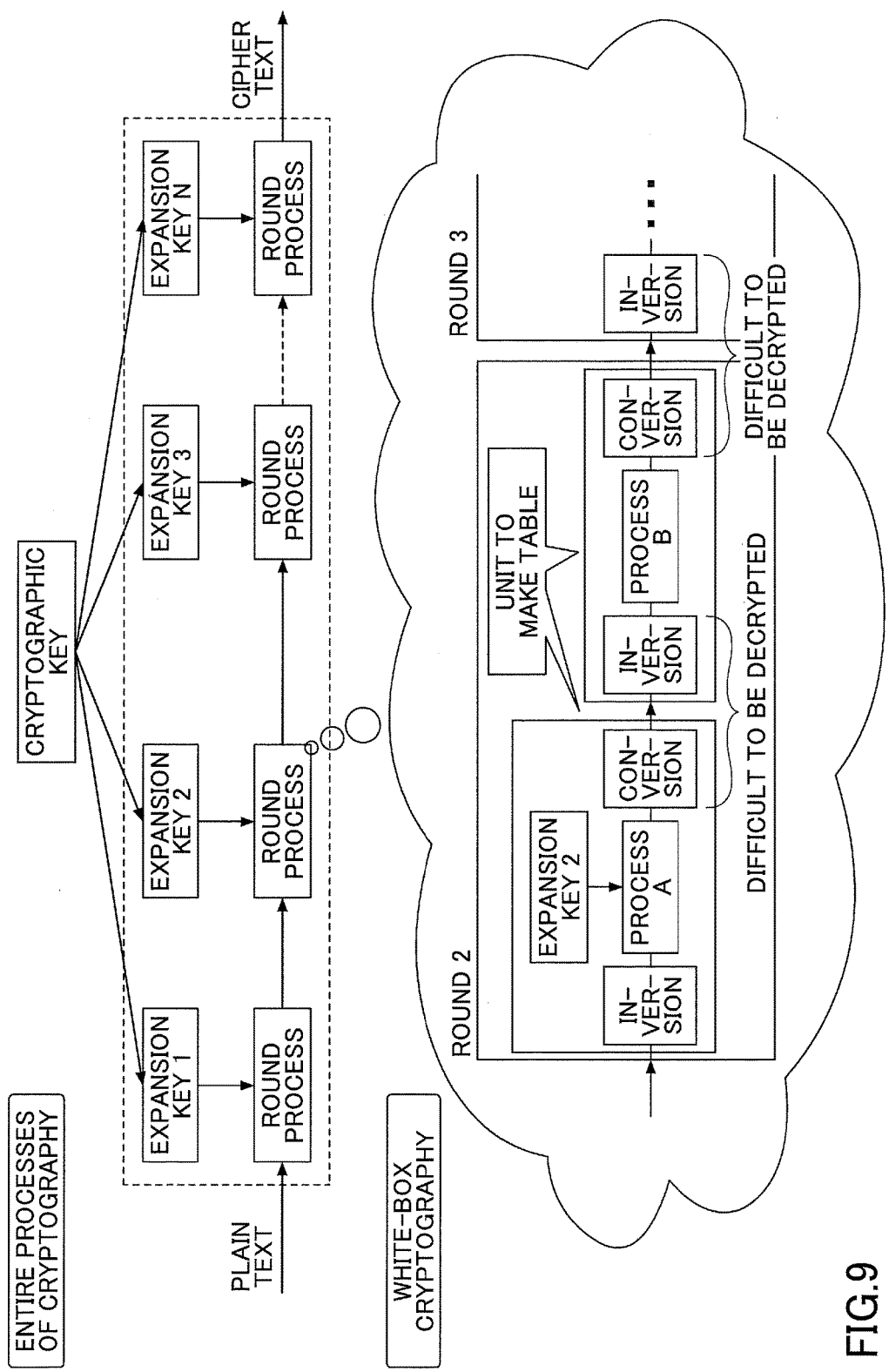
FIG. 9 is a conceptual view illustrating an example of a principle of White-Box Cryptography.

FIG. 9 is a conceptual view illustrating an example of a principle of the White-Box Cryptography.

In processes of cryptography (encryption), input data (data of plain texts) is encrypted by using key data such as expansion keys to generate output data (data of cipher texts).

According to the AES, depending on a key length, a plurality of round processes are performed. For example, when the key length is 128 bits, 192 bits and 256 bits, 10 round processes, 12 round processes and 14 round processes are performed, respectively. Thus, an expansion key is generated from a cryptographic key for each of the round processes. For example, when the key length is 128 bits, 192 bits and 256 bits, generally, 10 expansion keys, 12 expansion keys and 14 expansion keys are generated, respectively. In other words, for a case when the key length is 128 bits, 1st to 12th expansion keys are prepared for 1st to 12th round processes, respectively.

Furthermore, according to the White-Box Cryptography, a predetermined process including a plurality of processes such as a process A and a process B are performed in each of the round processes. Here, for example, in the process A, data is encrypted using key data such as an expansion key prepared for the respective round process. For the round process as illustrated, which is assumed as a "round 2", an "expansion key 2" prepared for the "round 2" is used in the process A. Similarly, an "expansion key 3" prepared for a "round 3" is used in a process of the "round 3".

Furthermore, according to the White-Box Cryptography, conversion and inversion are provided between adjacent processes (between the process A and the process B, for example). By providing such conversion and inversion in the White-Box Cryptography, data can be made difficult to be decrypted.

Figure 10:
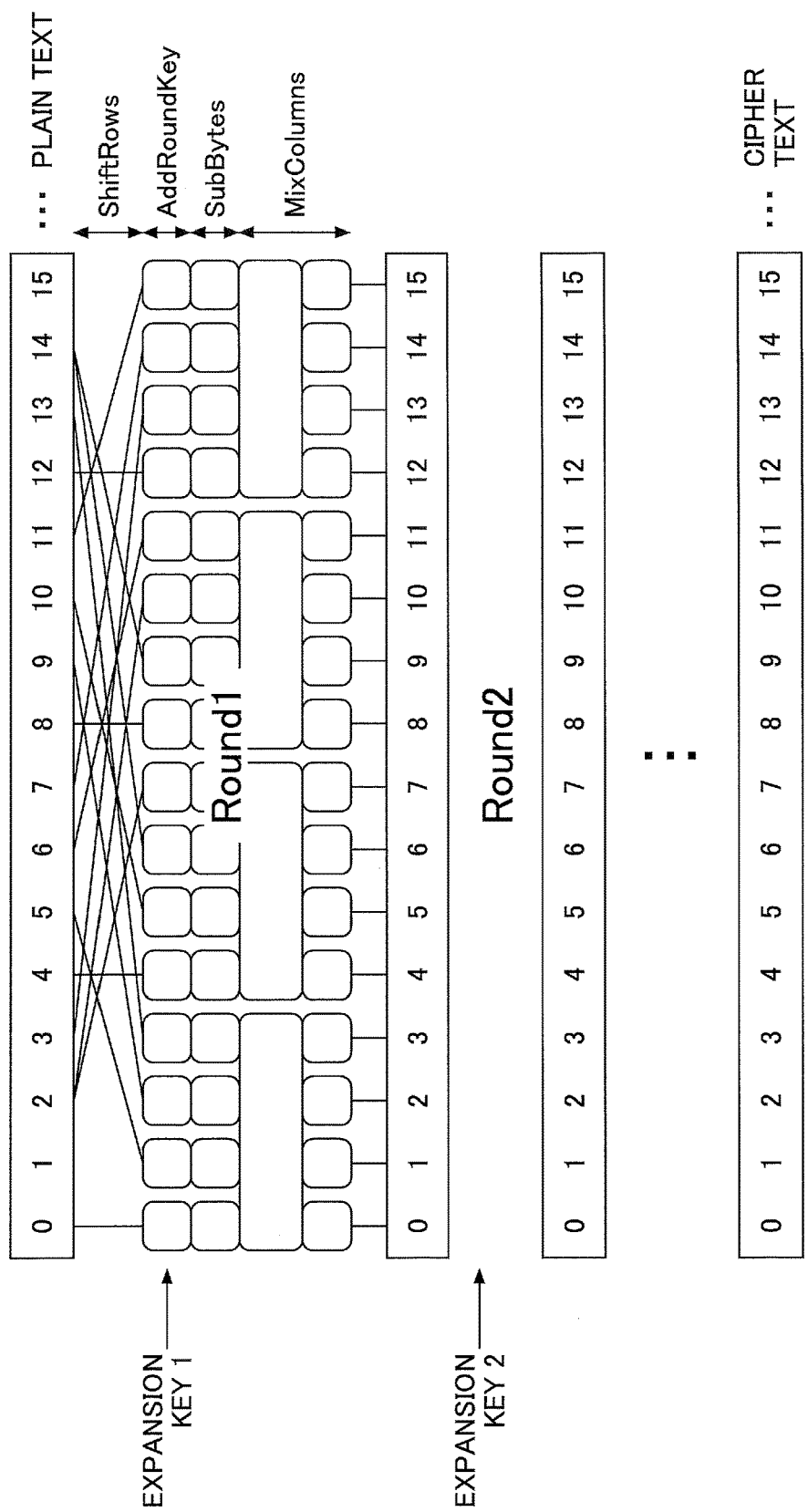
FIG. 10 is a schematic view illustrating an example of a round process of the White-Box Cryptography.

These processes can be schematically illustrated in FIG. 10. FIG. 10 is a schematic view illustrating an example of the round process of the White-Box Cryptography. Processes of "ShiftRows", "AddRoundKey", "SubBytes" and "MixColumns" are performed in each of the round processes. Such a round process as illustrated is performed repeatedly in accordance with a key length, as described above.

Referring back to FIG. 9, according to the White-Box Cryptography, each process may be performed by conversion (calculation) using a table. The table used for the conversion is a so-called Look Up Table (LUT) or the like. As illustrated, inversion and conversion are performed between adjacent processes each being a unit to make a table.

Alternatively, such a plurality of processes (the inversion, the process A using the key data, the process B, the conversion and the like) may be performed by single conversion (calculation) using a table. In such a case, the table is prepared such that a result obtained by the conversion using the table becomes the same as a result obtained by performing the inversion, the process A using the expansion key 2, the process B, the conversion and the like. In other words, the plurality of processes and the key data are synthesized into a table (LUT).

(1. Example of Hardware Structure of Embedded System)

FIG. 1 is a block diagram illustrating an example of a hardware structure of an embedded system 1 of the embodiment. The embedded system 1 includes an arithmetic unit HW1, a storage unit HW2 and an I/F (interface) HW3.

The arithmetic unit HW1 is a Central Processing Unit (CPU), a Micro Processing Unit (MPU) or the like. The arithmetic unit HW1 performs a calculation and a processing of data to actualize all of or a part of processes performed by the embedded system 1, and also functions as a control unit that controls hardware of the embedded system 1. As illustrated in FIG. 1, the arithmetic unit HW1 includes storage units such as a Random Access Memory (RAM) HW10, a Read-Only Memory (ROM) HW11 and the like, for example, to actualize a storage area by these storage units.

The RAM HW10 is a storage unit that stores programs, setting values, data or the like that are used by the arithmetic unit HW1 or the like.

The ROM HW11 is a storage unit that stores programs, setting values, data or the like that are used by the arithmetic unit HW1.

The storage unit HW2 is a so-called memory or the like. The storage unit HW2 is a main storage unit that stores programs, setting values, data or the like that are used by the embedded system 1. The storage unit HW2 may include an auxiliary storage unit or the like.

The I/F HW3 is an interface that inputs and outputs data or the like in and from the embedded system 1. The I/F HW3 is actualized by a bus, a connector, a cable, a driver or the like.

The hardware structure of the embedded system 1 is not limited to the illustrated structure. For example, the embedded system 1 may not include the storage unit HW2. Further, the embedded system 1 may further include an external or internal auxiliary device such as an arithmetic unit or the like.

(2. Example of Overall Processes of Embedded System)

The embedded system 1 of the embodiment encrypts or decrypts (decodes) data. Hereinafter, a case in which the embedded system 1 encrypts data is described as an example.

Figure 2:
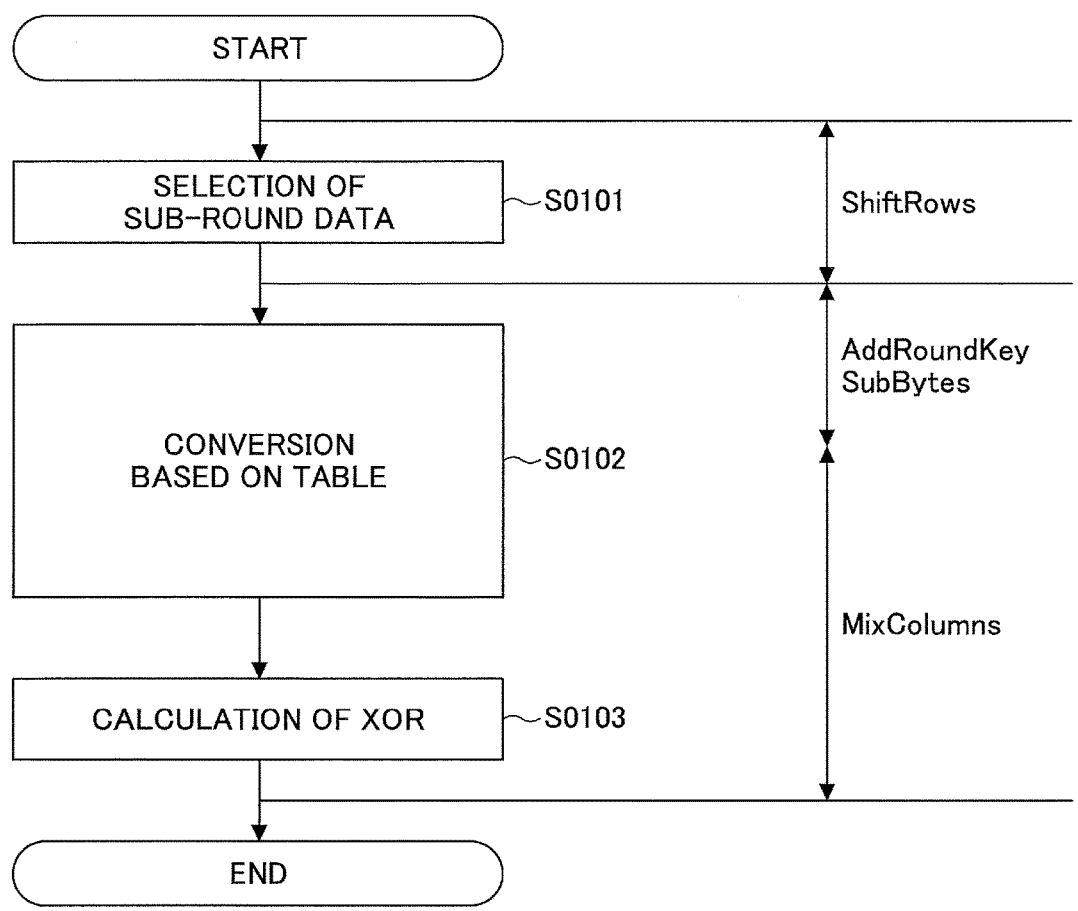
FIG. 2 is a flowchart illustrating an example of each round process of encryption of the embodiment.

FIG. 2 is a flowchart illustrating an example of each round process (hereinafter, referred to as "1-round") of encryption of the embodiment. In the AES, a process unit of data for 1-round is 16 bytes. In other words, data of 16 bytes is input for the process of 1-round. The process of 1-round is repeated in accordance with a bit length or the like of a key (key length) used in the AES, as described above. The process of 1-round corresponds to the illustrated process, or an equivalent process of the illustrated process.

(Example of Selection of Sub-Round Data (Step S0101))

In step S0101, the embedded system 1 selects data of 4 bytes (four data of 1 byte) from the input data of 16 bytes, as a process unit of each sub-round (hereinafter, referred to as "1-sub-round"). The process of 1-sub-round is repeated four times in the process of 1-round (1-round=4 bytes (1-sub-round)×4 sub-rounds=16 bytes).

Hereinafter, the selected data of 4 bytes is referred to as "sub-round data". Step S0101 is a process corresponding to "ShiftRows" illustrated in FIG. 10.

(Example of Conversion Based on Table (Step S0102))

In step S0102, similarly as described above with reference to FIG. 9, the embedded system 1 performs conversion based on a table for each data of 1 byte of the sub-round data selected in step S0101. The table used for the conversion is a so-called Look Up Table (LUT) or the like. The table is described later in detail. By the conversion, data of 4 bytes (four data of 1 byte) is generated from the data of 1 byte. Hereinafter, data generated by the conversion in step S0102 is referred to as "converted data".

The conversion process is performed four times in the process of 1-sub-round. Converted data of 4 bytes (four data of 1 byte) is generated from each of the data of 1 byte. In other words, the table is provided for each data of 1 byte of the sub-round data.

(Example of Calculation of Exclusive OR (XOR) (Step S0103))

In step S0103, the embedded system 1 calculates exclusive OR of the converted data. Here, step S0102 and step S0103 are processes corresponding to so-called "AddRoundKey", "SubBytes" and "MixColumns". Thus, when the overall processes illustrated in FIG. 2 are performed, the same processed result obtained by performing the processes of "AddRoundKey", "SubBytes" and "MixColumns" is obtained.

The table used in step S0102 is described below in detail.

In the following, the number of rounds is illustrated as "r", and an example is described in which a process of 1-round is repeated from r=1 (initial value) to r=R, in this order. This means that a round process that is performed first (hereinafter, referred to as an "initial round") is illustrated as r=1. Then, a round process that is performed last (hereinafter, referred to as a "final round") is illustrated as r=R. Further, round processes other than the initial round and the final round (hereinafter, referred to as "intermediate rounds") are illustrated as r=2 to r=R−1. The number of intermediate rounds varies in accordance with a key length.

No round process is performed before the initial round. Meanwhile, no round process is performed after the final round. On the other hand, other round processes are performed before and after each of the intermediate rounds. In accordance with these facts, different processes are performed for the initial round, the intermediate rounds and the final round. Thus, in the following, the processes of the initial round, the intermediate rounds and the final round are separately described using schematic views, respectively.

(Example of Process of Initial Round)

Figure 3:
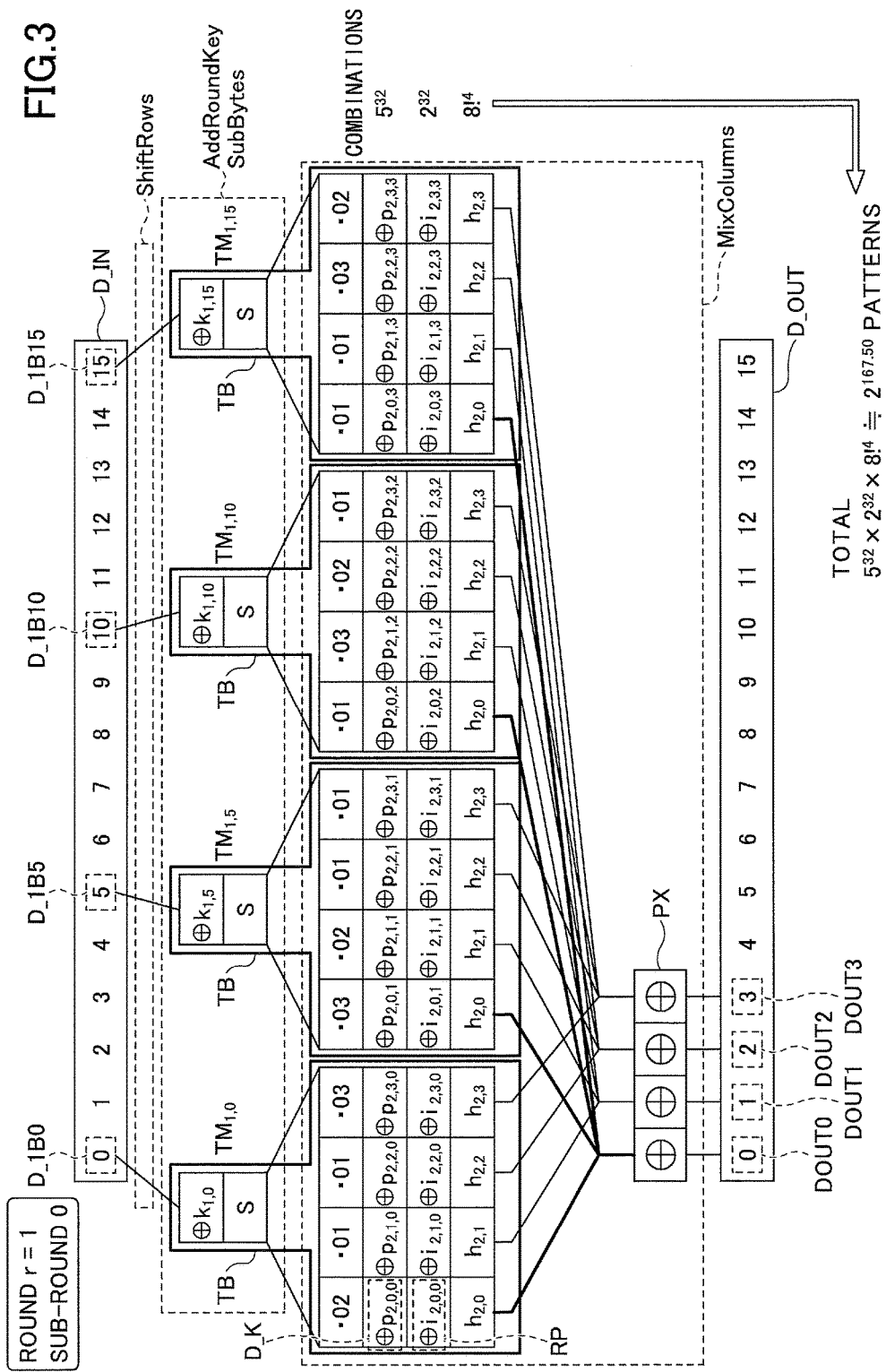
FIG. 3 is a schematic view illustrating an example of a process of an initial round of the embodiment.

FIG. 3 is a schematic view illustrating an example of a process of the initial round (r=1) of the embodiment.

Here, data of 16 bytes (hereinafter, referred to as "input data "D_IN"") composed of 0th data "D_1B0" of 1 byte to 15th data "D_1B15" of 1 byte is input as a process target for 1-round. Then, the embedded system 1 selects 4 data of 1 byte from the input data "D_IN". In the illustrated example, the embedded system 1 selects the 0th data "D_1B0", 5th data "D_1B5", 10th data "D_1B10" and the 15th data "D_1B15". These four data of 1 byte compose sub-round data. In the following, a process to the 0th data "D_1B0" of the sub-round data is mainly described as an example.

Here, the process of selecting the four data of 1 byte from the input data "D_IN" corresponds to the process of "ShiftRows", and also corresponds to the process of step S0101 of FIG. 2.

Next, the embedded system 1 converts the 0th data "D_1B0" based on a previously prepared and stored table "TB". The table "TB" is prepared for each data of 1 byte of the sub-round data selected in step S0101. Then, four converted data of 1 byte are generated by the conversion by the table "TB". In other words, by the conversion by the table "TB", converted data of 4 bytes is generated. This process is performed for each of the 5th data "D_1B5" the 10th data "D_1B10" and the 15th data "D_1B15" as well. In other words, four tables "TB" are prepared for each of the sub-round data.

Each of the tables "TB" is prepared such that a result obtained by the conversion using the respective table "TB" becomes the same as a result obtained by performing a predetermined process including a plurality of processes illustrated in FIG. 3. The tables "TB" of FIG. 3 schematically illustrate the plurality of processes.

In FIG. 3, "k" indicates key data of the initial round. Thus, this process indicates an encryption process using the key data of the initial round. As no former round is performed before the initial round, "k" indicates all of the key data of the initial round.

Further, "S" indicates conversion by an S-BOX, in other words, "S" indicates a component similar to an execution of a "SubBytes" function. Thus, this process indicates a conversion process by the S-BOX.

Further, "·03", "·02" and "·01" indicate multiplications based on an irreducible polynomial for AES. In other words, "·03" indicates "3 times" by the multiplication based on the irreducible polynomial for AES, for example.

Further, "p" indicates key data "D_K" including a part of or all of key data that is prepared for a next round. Thus, this process indicates an encryption process using at least a part of the key data prepared for the next round.

As will be described later with reference to FIG. 5 and FIG. 6 as well, for example, "i" indicates a random component. For example, "i" indicates addition of random numbers by exclusive OR.

As will be described later with reference to FIG. 6 as well, "h" indicates sorting of bits, and indicates a component that does not influence exclusive OR. Hereinafter, similarly described.

Specifically, the tables "TB" is prepared such that a result obtained by the conversion using the respective table "TB" becomes the same as a result obtained by performing the encryption process using the key data "k", the conversion process using the S-BOX, a process of multiplication, the encryption process using the key data "D_K" which is a part of or all of the key data prepared for the next round, a process using the random component "i" and a process of sorting of bits (expressed by "h"). Values of each of the tables "TB" are calculated by assuming that the above described processes are performed. For the illustrated example, although not illustrated in the drawings, each of the Tables "TB" is composed of a matrix of 4 (bytes)×256

(patterns). Hereinafter, the above described processes (including the key data) are referred to as "table constituting components".

Next, the embedded system 1 calculates exclusive OR "PX" of four converted data of 1 byte each selected from the converted data of the 0th data "D_1B0", the 5th data "D_1B5", the 10th data "D_1B10" and the 15th data "D_1B15". In the illustrated example, the first data of 1 byte is selected from each of the four converted data of the 0th data "D_1B0", the 5th data "D_1B5", the 10th data "D_1B10" and the 15th data "D_1B15". By such the calculation, the embedded system 1 outputs 0th output data "DOUT0" of output data "D_OUT".

Similarly, the embedded system 1 further calculates exclusive OR "PX" of four converted data of 1 byte selected from the converted data of the 0th data "D_1B0", the 5th data "D_1B5", the 10th data "D_1B10" and the 15th data "D_1B15" next. By repeating the calculation process three times, the embedded system 1 outputs 1st output data "DOUT1", 2nd output data "DOUT2" and 3rd output data "DOUT3" of the output data "D_OUT".

As described above, the key data "D_K" that is prepared for another round (next round, for example) different from the initial round is included in the table constituting components of the table "TB".

As described above with reference to FIG. 9, according to the White-Box Cryptography (AES), an expansion key is prepared for each of the round processes. Conventionally, the expansion key prepared for an nth round is used in the nth round. However, according to the embodiment, the table "TB" is prepared as if an expansion key prepared for an mth round is used in the nth round ("m" is larger than "n").

Figure 4:
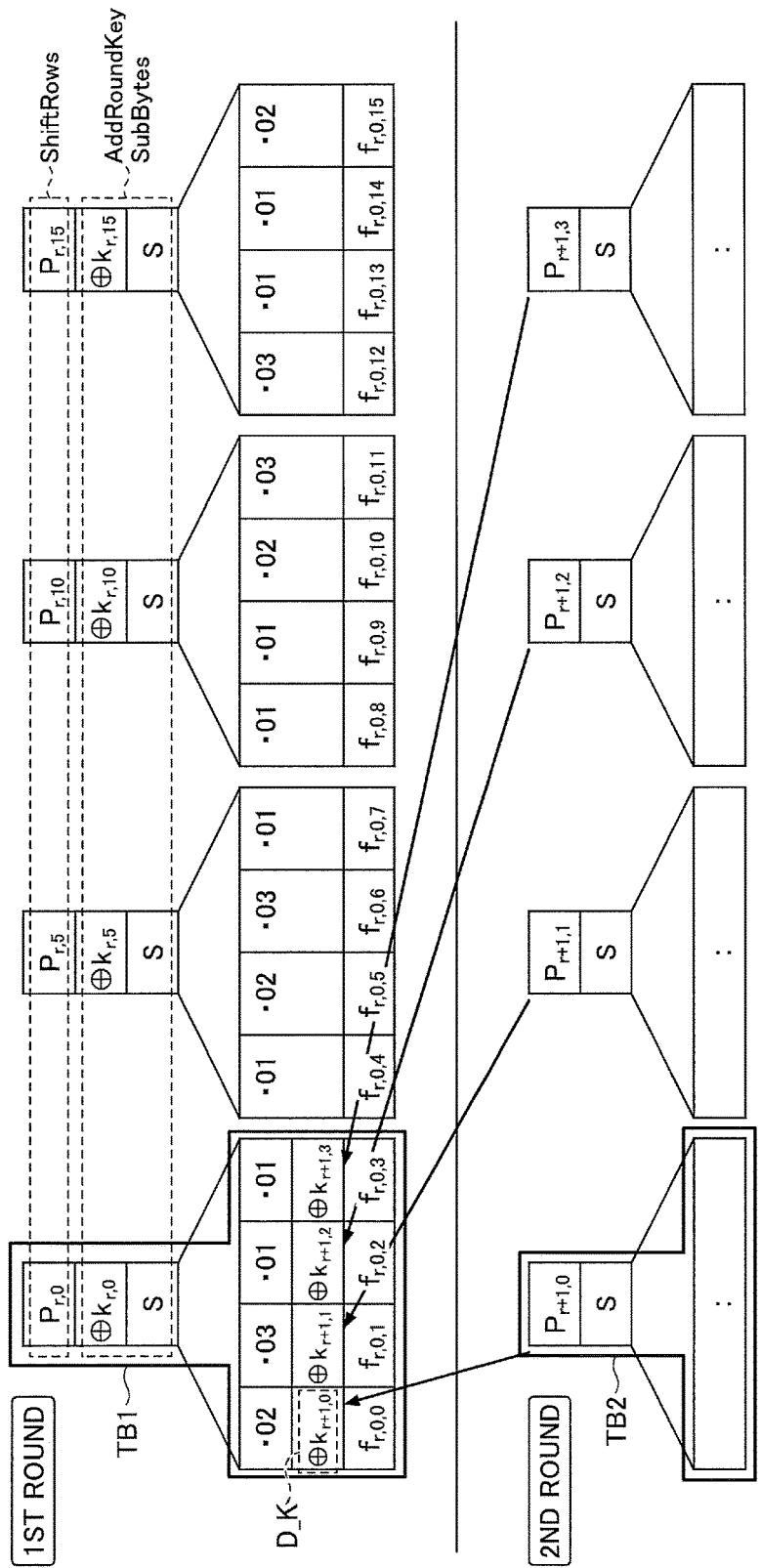
FIG. 4 is a schematic view illustrating an example of key data included in table constituting components of a table of the embodiment.

FIG. 4 is a schematic view illustrating an example of the key data "D_K" (illustrated as "$k_{r+1}$" in FIG. 4) used to prepare the table of the embodiment.

Here, for example, when a 1st round is assumed as a round of "r=1", a 2nd round is a round of "r=2" that is performed next to the 1st round. FIG. 4 illustrates an example of conversion by a first table "TB1" (same as the table "TB" illustrated in FIG. 3) for 1-sub-round in the 1st round, and conversion by a second table "TB2" for 1-sub-round in the 2nd round. Although only a set of the first table "TB1" and the second table "TB2" is illustrated in FIG. 4, similar to FIG. 3, the table prepared for each data of 1 byte of the sub-round data. This is the same for the following drawings as well. The 1st round is the initial round as illustrated in FIG. 3, for example. The 2nd round is the round of "r=2".

In FIG. 4, "P" indicates inversion of the conversion performed in the former round at output. The "conversion performed in the former round at output" means a process to treat the output result as 0th, 1st, 2nd and 3rd in the output data "D_OUT". In other words, when it is assumed that the "conversion performed in the former round at output" is referred to as "conversion", "P" indicates "inversion" of the "conversion performed in the former round at output". Here, although "P" is illustrated in the first table "TB1" for 1-sub-round in the 1st round, when the 1st round is the initial round as described above, the process using "P" is not actually included in the processes for the first table "TB1" for 1-sub-round.

Further, in FIG. 4, "f" corresponds to a component combining "i" and "h" illustrated in FIG. 3. Further, a part of the second table "TB2" for the 2nd round, same as that of the first table "TB1" for the 1st round, is not illustrated (omitted) in FIG. 4.

As illustrated in FIG. 4, the table constituting components of the first table "TB1" used in the 1st round include key data "D_K" prepared for the 2nd round. For example, the first table "TB1" used in the first round is previously generated such that a process using the key data prepared for the 2nd round is reflected therein. As such, according to the embedded system 1 of the embodiment, by configuring the first table "TB1" such that a process using all of or a part of the key data prepared for the other round is reflected therein, it is difficult to estimate key data for the 1st round even when the first table "TB1" for the 1st round is analyzed. In other words, according to the embedded system 1, by configuring the key data used for the present round to include a part that is prepared for the other round, an amount of processing necessary for analyzing data per byte of the key data for estimating the key data is increased.

In the illustrated example, the four key data prepared for the 2nd round are included in the table constituting components of the first table "TB1" used in the process of the 0th data. As such, according to the embodiment, the first table "TB1" is previously generated such that the result becomes the same as a case when key data including the key data "D_K" of the other round is used, for example.

However, the embodiment of the invention is not limited to the illustrated example. For example, according to the embedded system 1, the key data "D_K" prepared for the other round may be dispersedly included in the table constituting components of each of a plurality of tables of the 1st round in a bit unit. In such a case, when estimating the key data, there are five cases for the key data "D_K" of the other round to be included, including "not included" and four (1 byte×4 cases) sets of the table constituting components of the tables. Thus, if the key data is 8 bits, included positions of the key data "D_K" of the other round are combinations of "$5^8$". As the process of 1-round includes four data of 1 byte, there are combinations of "$5^8$"=$5^{32}$" (see FIG. 3).

Furthermore, for example, not only the key data "D_K" prepared for the 2nd round, but key data "D_K" prepared for the 3rd round or later rounds may be included in the table constituting components of the tables of the 1st round. Similarly, for another round, key data "D_K" prepared for yet other rounds, later than the respective round, may be included in the table constituting components of the tables of the respective round. As such, the pattern of dispersing key data "D_K" prepared for the other round, later than the respective round, may be arbitrarily determined, and the patterns may not be the same.

With this configuration, according to the embedded system 1 of the embodiment, the data can be made difficult to be decrypted against a method of decrypting the data or the like by analyzing a relationship between input and output in an encryption process such as a so-called BGE attack (referred to as "input-output corresponding attack" or the like as well). More specifically, the BGE attack is described in "Cryptanalysis of a White Box AES Implementation" Olivier Billet, Henri Gilbert, Charaf Ech-Chatbi, Selected Areas in Cryptography: 11th International Workshop, SAC 2004", for example.

With reference to FIG. 3, for example, if the BGE attack is performed, what kind of process is performed between input and output or the like is analyzed based on a relationship between the 0th data "D_1B0", which is an example of the input, and the output data "DOUT0" of 1 byte, which is an example of the output. In other words, there is an attacking method by which key data or a content of a process performed between the input and the output is estimated based on how the input data is changed as the output.

However, according the embodiment, as illustrated in FIG. 4, the embedded system 1 performs the conversion process of the 1st round by using the first table "TB1" that is generated such that the key data "D_K" prepared for the 2nd round is reflected therein. In other words, the embedded system 1 performs the conversion process based on the previously generated first table "TB1". Thus, even when the first table "TB1" and the like are analyzed by the BGE attack or the like, the embedded system 1 can make the key data for the 1st round difficult to be estimated. As illustrated in FIG. 4, in other words, by performing the process of the 1st round in which the key data "D_K" prepared for the 2nd round is reflected, the embedded system 1 can make the key data difficult to be decrypted against the BGE attack or the like. As such, the embedded system 1 can make data difficult to be decrypted in AES.

Further, as illustrated in FIG. 2, according to the embedded system 1 of the embodiment, by performing the conversion of the processes other than the processes of step S0101 and step S0103 based on a single table, the number of processes can be reduced. In other words, if processes included in each table are increased, difficulty in analyzing of the key data or the performed process for breaking security or the like can be increased. As such, according to the embedded system 1 of the embodiment, security can be improved. Further, process load may be decreased when the number of processes is reduced.

Referring back to FIG. 3, it is preferable that the table constituting components of the table "TB" include the random number component "RP". When such a random number component "RP" is included, the embedded system 1 can make the data furthermore difficult to be decrypted in AES. This is illustrated as follows.

Figure 5:
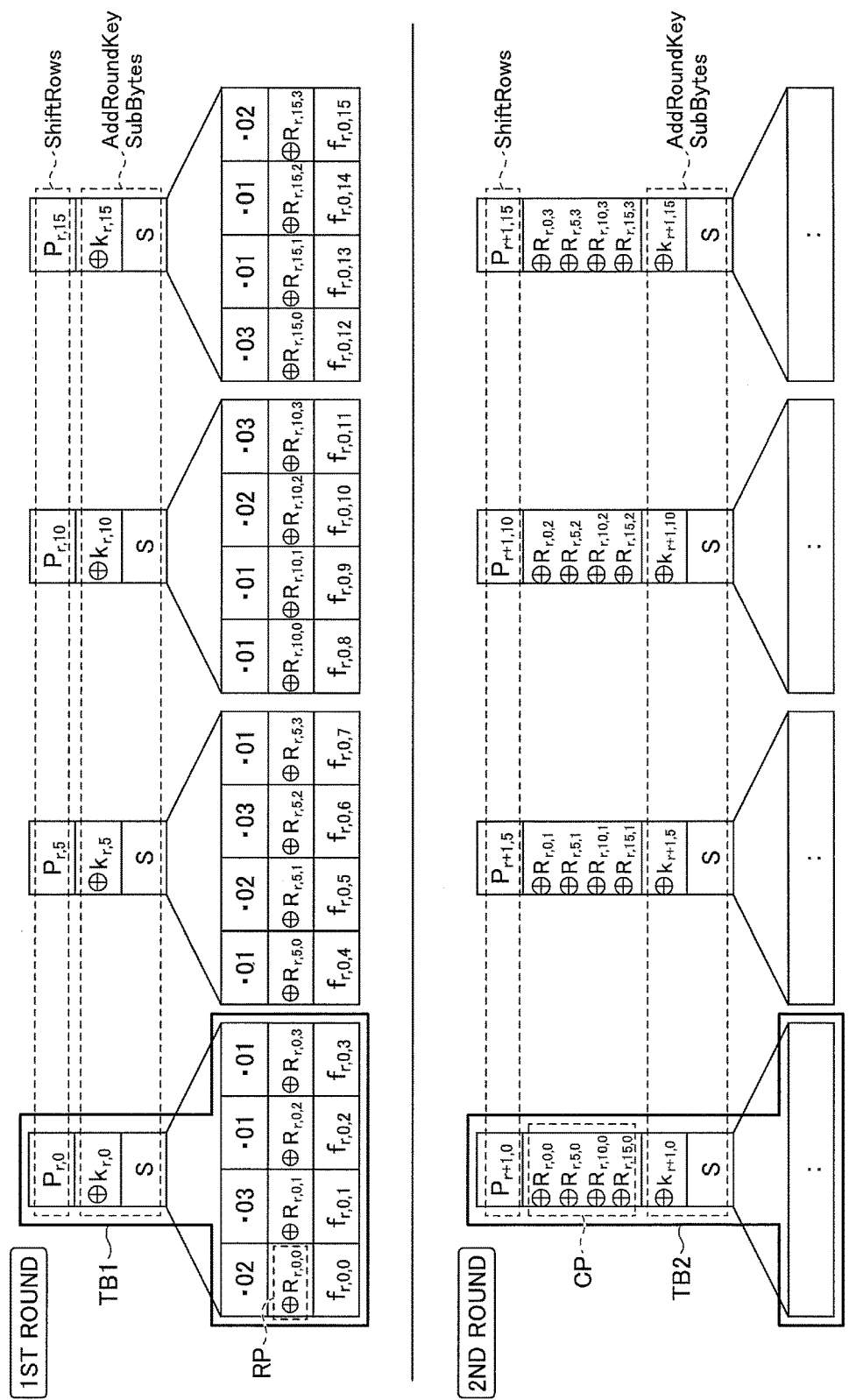
FIG. 5 is a schematic view illustrating an example of a random number component included in table constituting components of a table of the embodiment.

FIG. 5 is a schematic view illustrating an example of the random number component "RP" included in the table constituting components of the table of the embodiment. Similar to FIG. 4, FIG. 5 illustrates an example of a first table "TB1" that is used for a process of 1 sub-round performed in the 1st round and a second table "TB2" that is used for a process of 1 sub-round performed in the 2nd round. Further, similar to FIG. 4, a part of the second table "TB2" for the 2nd round, same as that of the first table "TB1" for the 1st round, is not illustrated (omitted) in FIG. 5.

As illustrated in FIG. 5, the embedded system 1 is configured such that the table constituting components of the first table "TB1" for the 1st round include the random number component "RP". Here, "$R_r$" of the first table "TB1" indicates the random number component "RP" in FIG. 5. For example, the first table "TB1" for the 1st round is previously generated to include the random number component "RP" as one of its table constituting components.

In other words, in order to generate the first table "TB1" that contain the random number component "RP" as the table constituting components, for example, when generating the data of the first table "TB1", first, a data processing apparatus performs a random function or the like for generating the random number to generate the random number. Here, the data processing apparatus for preparing the table "TB" may be different from the embedded system 1, as will be described with reference to FIG. 14.

Furthermore, the data processing apparatus generates a component (hereinafter, referred to as a canceling component "CP") that cancels the generated random number. Here, in FIG. 5, "R" of the table constituting components of the second table "TB2" for the 2nd round indicates the canceling component CP.

Then, as illustrated in FIG. 5, the data processing apparatus generates the first table "TB1" for the 1st round such that the random number component "RP" is reflected in the first table "TB1". When the data is converted by the first table "TB1" including the random number component "RP" as the table constituting components of in the 1st round, the converted data generated in the 1st round contains the random number component "RP". Further, the data processing apparatus generates the second table "TB2" for the 2nd round such that the canceling component "CP" that cancels the random number component "RP" contained in the first table "TB1" for the 1st round is reflected in the second table "TB2". With this configuration, the process using the random number component "RP" contained by the conversion in the 1st round is canceled when the conversion in the 2nd round is performed.

Further, when the first table "TB1" is configured such that the random number component "RP" is reflected therein, an additional process to analyze the random number component "RP" is necessary when analyzing the data. Thus, according to the embedded system 1 of the embodiment, the data can be made furthermore difficult to be decrypted in AES. Here, in the illustrated example, there are combinations of "$2^{8 \times 4} = 2^{32}$" for the random number component "RP" (see FIG. 3).

Here, the canceling component CP may not be only contained in the table constituting components of the second table "TB2" for the 2nd round. For example, among the conversions performed for four data of 1 byte in the sub-round data in 1-round, respectively, the tables in each of which the random number component "RP" is reflected may be used for three data of 1 byte, and the table in which the canceling number component "CP" is reflected may be used for the rest of one data of 1 byte. With this configuration as well, according to the embedded system 1 of the embodiment, the random number component "RP" can be included as the table constituting components of the table "TB", and the data can be made furthermore difficult to be decrypted in AES.

Referring back to FIG. 3, in the calculation of the exclusive OR "PX", the embedded system 1 collects each data of 1 byte from the converted data of the 0th data "D_1B0", the 5th data "D_1B5", the 10th data "D_1B10" and the 15th data "D_1B15", and calculates the exclusive OR "PX" of the collected four data of 1 byte to output data of 1 byte of the output data DOUT. As illustrated in FIG. 3, when the embedded system 1 performs the processes up to calculation of the exclusive OR "PX" for each sub-round data, the embedded system 1 can generate four data of 1 byte, "DOUT0", "DOUT1", "DOUT2" and "DOUT3".

Here, the conversion based on the table "TB" and the calculation of the exclusive OR "PX" correspond to the processes of "AddRoundKey", "SubBytes" and "MixColumns". Further, the conversion by the table "TB" corresponds to the process of step S0102 illustrated in FIG. 2. The process of calculating the exclusive OR "PX" of each of the converted data corresponds to the process of step S0103 illustrated in FIG. 2.

As will be described later with reference to FIG. 6, there are combinations of "8! (factorial)" patterns by "h" for 8 bits. Thus, as illustrated in FIG. 3, combinations of tables corresponding to the key of 1 byte in the 1st round become about "$2^{167.50}$" patterns.

(Example of Process of Intermediate Round)

Figure 6:
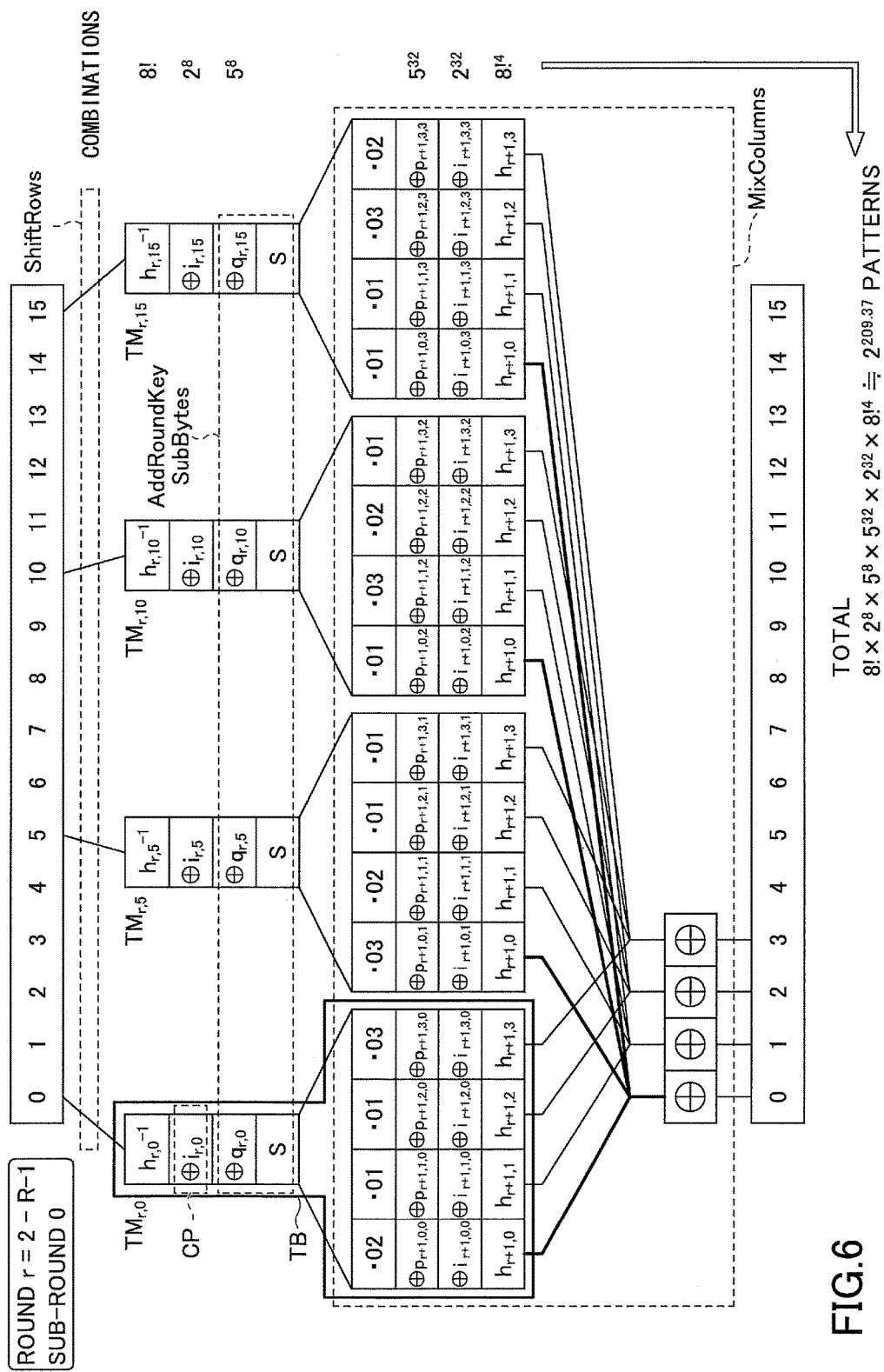
FIG. 6 is a schematic view illustrating an example of a process of an intermediate round of the embodiment.

FIG. 6 is a schematic view illustrating an example of the process of the intermediate round of the embodiment. It is assumed that the illustrated process is performed in a round next to the round of the process illustrated in FIG. 3. In the following, points different from the process of FIG. 3 are mainly described.

The process illustrated in FIG. 6 is different from the process illustrated in FIG. 3 in that "$h_{r,0}^{-1}$", "$h_{r,5}^{-1}$", "$h_{r,10}^{-1}$" and "$h_{r,15}^{-1}$" are included as the table constituting components. These "$h_{r,0}^{-1}$", "$h_{r,5}^{-1}$", "$h_{r,10}^{-1}$" and "$h_{r,15}^{-1}$" are an example of components that are inversions of "h" by the conversion by the conversion illustrated in FIG. 3. Here, as described above, "h" indicates sorting of bits, and indicates a component that does not influence exclusive OR. Specifically, when the bits are sorted by "h", bits in the data are sorted. Here, for case when the data is 8 bits, there are combinations of "8! (factorial)" patterns by "h". On the other hand, "$h^{-1}$" indicates sorting of bits that returns the order of bits sorted by "h" to its original order (return to the order of bits before being sorted by "h"). Thus, when both components of "h" and "$h^{-1}$" are included, a result same as the result without the sorting by "h" is obtained.

Further, the process illustrated in FIG. 6 is different from the process illustrated in FIG. 3 in that "$i_{r,0}$", "$i_{r,5}$", "$i_{r,10}$" and "$i_{r,15}$" are included as the table constituting components. These "$i_{r,0}$", "$i_{r,5}$", "$i_{r,10}$" and "$i_{r,15}$" are an example of the canceling components CP that cancel the random number components "RP" included as the table constituting component of the table "TB" (FIG. 3) in the initial round. For example, "i" indicates addition of random numbers by exclusive OR.

In FIG. 6, "q" indicates a component of key data of the current round. In detail, there is a case that only a partial component of the key data prepared for the current round is included as the table constituting components of the table "TB" for the former round. In such a case, "q" indicates a remaining component of the key data prepared for the current round, which is not included as the table constituting components of in the table "TB" for the former round. Here, for a case that the component of the key data of the current round is not included at all in the table constituting components of the table "TB" for the former round, "q" indicates all of the key data of the current round.

Here, the round and the input data are illustrated for each of "$h^{-1}$", "i" and "q" as subscripts. Specifically, for "$h_{r,0}^{-1}$", "r" indicates the 1st round, in other words, the former round, and "r+1" indicates the 2nd round, in other words, the current round. "0" corresponds to 0th data of the input data.

Further, similar to the process of the 1st round (see FIG. 3), the key data that is prepared for the other round such as "$p_{r+1,0,0}$" or the like is included in the table constituting components of the table. For the 2nd round, the other round is the 3rd round, for example. As such, according to the embedded system 1 of the embodiment, by configuring to perform the process such that the key data prepared for the other round is reflected, similar to the process of the 1st round, the data can be difficult to be decrypted against the BGE attack or the like.

Here, as illustrated in FIG. 6, combinations of tables corresponding to the key of 1 byte in the intermediate round become about "$2^{209.37}$" patterns.

Further, in a sub-round next to the sub-round of FIG. 6, for example, the process as follows is performed.

Figure 7:
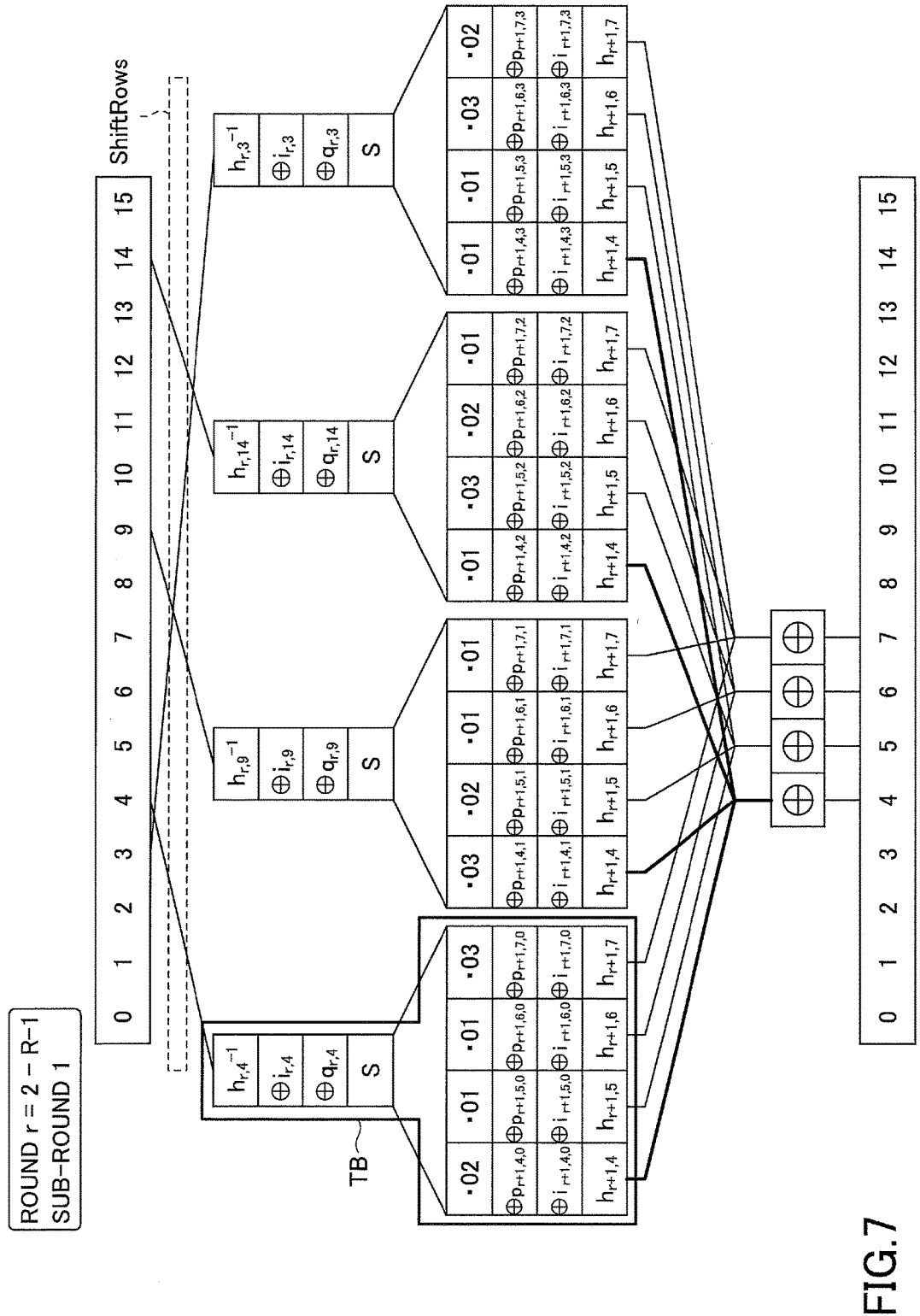
FIG. 7 is a schematic view illustrating another example of a process of an intermediate round of the embodiment.

FIG. 7 is a schematic view illustrating another example of the process of the intermediate round of the embodiment. The process illustrated in FIG. 7 is an example of the process that is performed in a sub-round next to the sub-round of FIG. 6 in the same round as that of FIG. 6. For the process illustrated in FIG. 7, the sub-round data selected from the input data is different from that of the process illustrated in FIG. 6. The processes are performed for the selected sub-round data similarly as illustrated in FIG. 6. Thus, the embedded system 1 can make the data difficult to be decrypted against the BGE attack or the like, similarly as the process of the initial round and the process of the intermediate round as illustrated in FIG. 6.

(Example of Process of Final Round)

Figure 8:
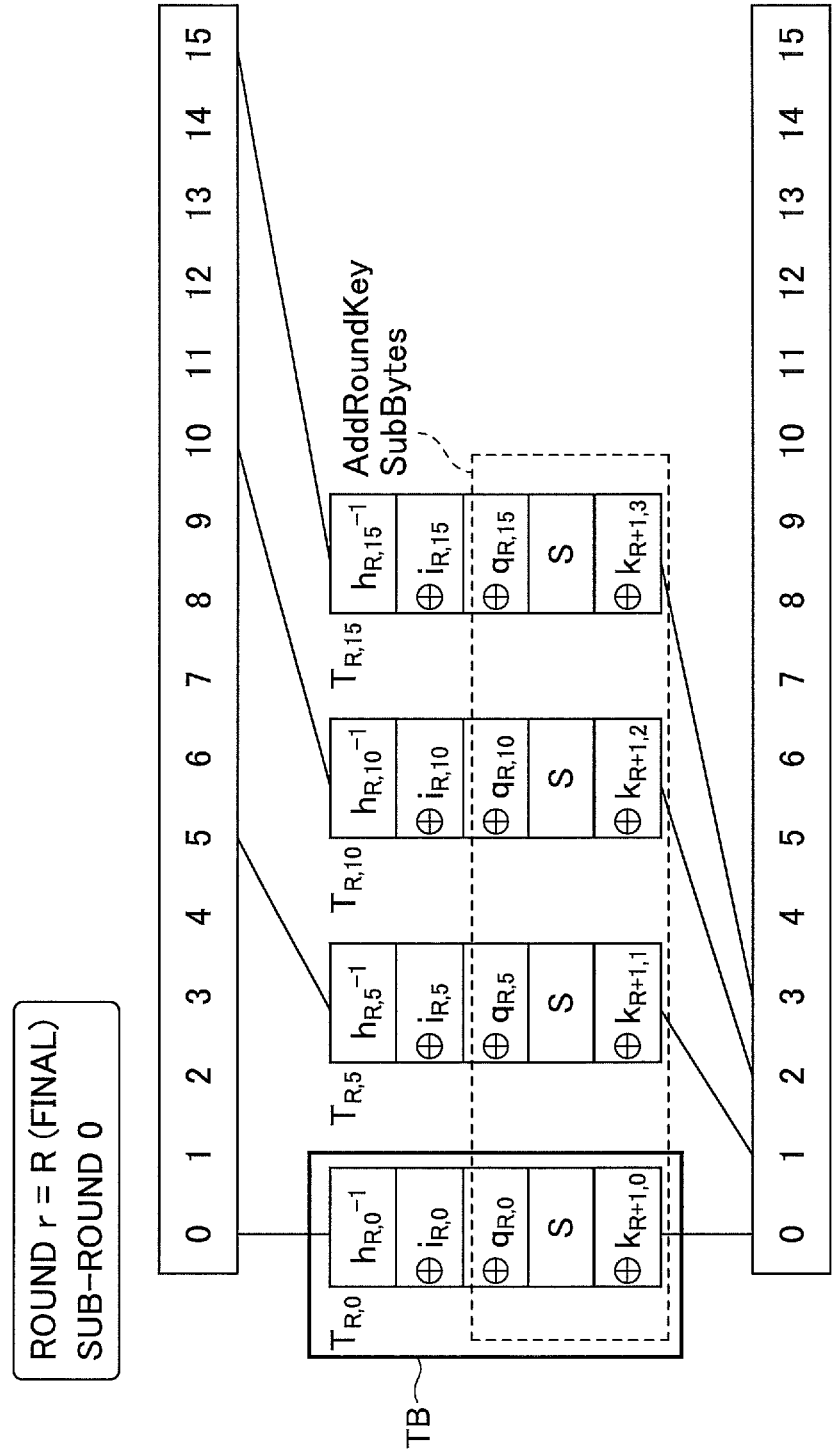
FIG. 8 is a schematic view illustrating an example of a process of a final round of the embodiment.

FIG. 8 is a schematic view illustrating an example of the final round of the embodiment. The process illustrated in FIG. 8 is different from the process illustrated in each of FIG. 6 and FIG. 7 in that the process by the table corresponding to "MixColumns" is not included. Further, the process illustrated in FIG. 8 is different in that the process corresponding to "AddRoundKey" is preformed twice (using "$q_{R,0}$" and the like, and "$k_{R,0}$" and the like).

No round is performed after the final round. Thus, in the process of the final round, different from the process of each of FIG. 3, FIG. 6 and FIG. 7, key data from a following round is not included as the table constituting components of the table. Thus, for the process of the final round, although key data prepared for the final round may be included as the table constituting components of the table of the former round (intermediate round or the like), the process corresponding to "MixColumns" performed by including the key data from the following round in the current table is not included.

Comparative Example

Figure 11:
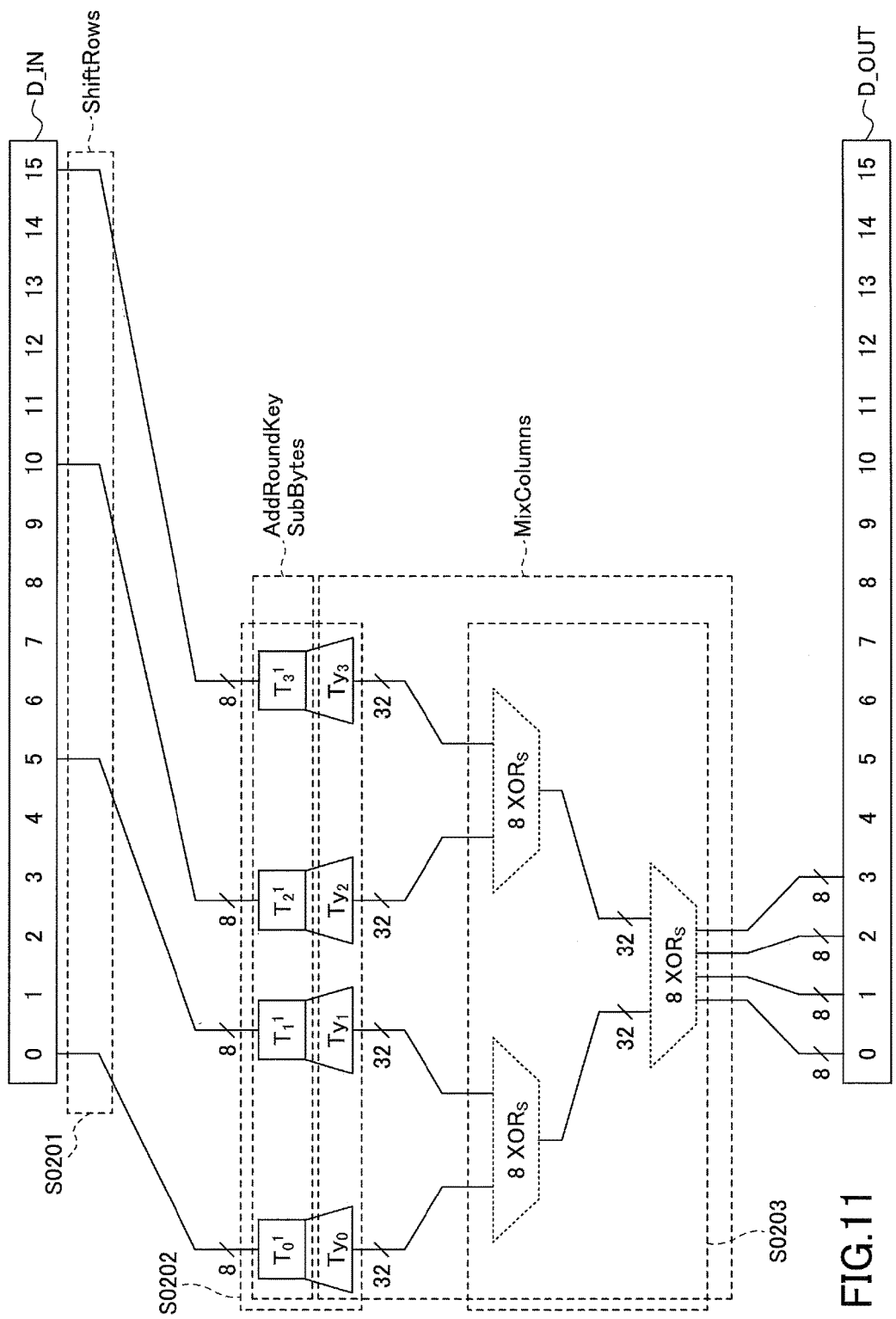
FIG. 11 is a schematic view (No. 1) illustrating an example of a process of 1-round of encryption of a comparative example.

FIG. 11 is a schematic view (No. 1) illustrating an example of a process of 1-round of an encryption of a comparative example. FIG. 11 illustrates an example of a process of 1 sub-round in which four data of 1 byte of output data D_OUT are generated from four data of 1 byte of input data "D_IN". Further, the process illustrated in FIG. 11, in other words, in the process of 1-round, processes of 4 sub-rounds are repeatedly performed. In the following, the process of 1 sub-round is mainly described.

In step S0201, four data of 1 byte are selected. Further, a processed result obtained by performing step S0201 and a processed result obtained by performing a "ShiftRows" function defined in FIPS 197 are similar.

In step S0202, data of 1 byte selected in step S0201 is converted by a so-called T-Box or the like to output converted data.

In step S0203, conversion by tables such as so-called XOR-Tables or the like is performed on the data output in step S0202. As illustrated in FIG. 11, a processed result similar to a case when the exclusive OR is calculated is output.

As illustrated in FIG. 11, a processed result obtained by performing an "AddRoundKey" function, a "SubBytes" function and a "MixColumns" function defined in FIPS 197, and a processed result obtained by performing the processes of step S0202 and step S0203 are similar.

When the process for 1-sub-round is performed, four data of 1 byte, which are the output of step S0203, are output as "0" to "3" data of the output data "D_OUT".

The process of the comparative example can be expressed as follows.

Figure 12:
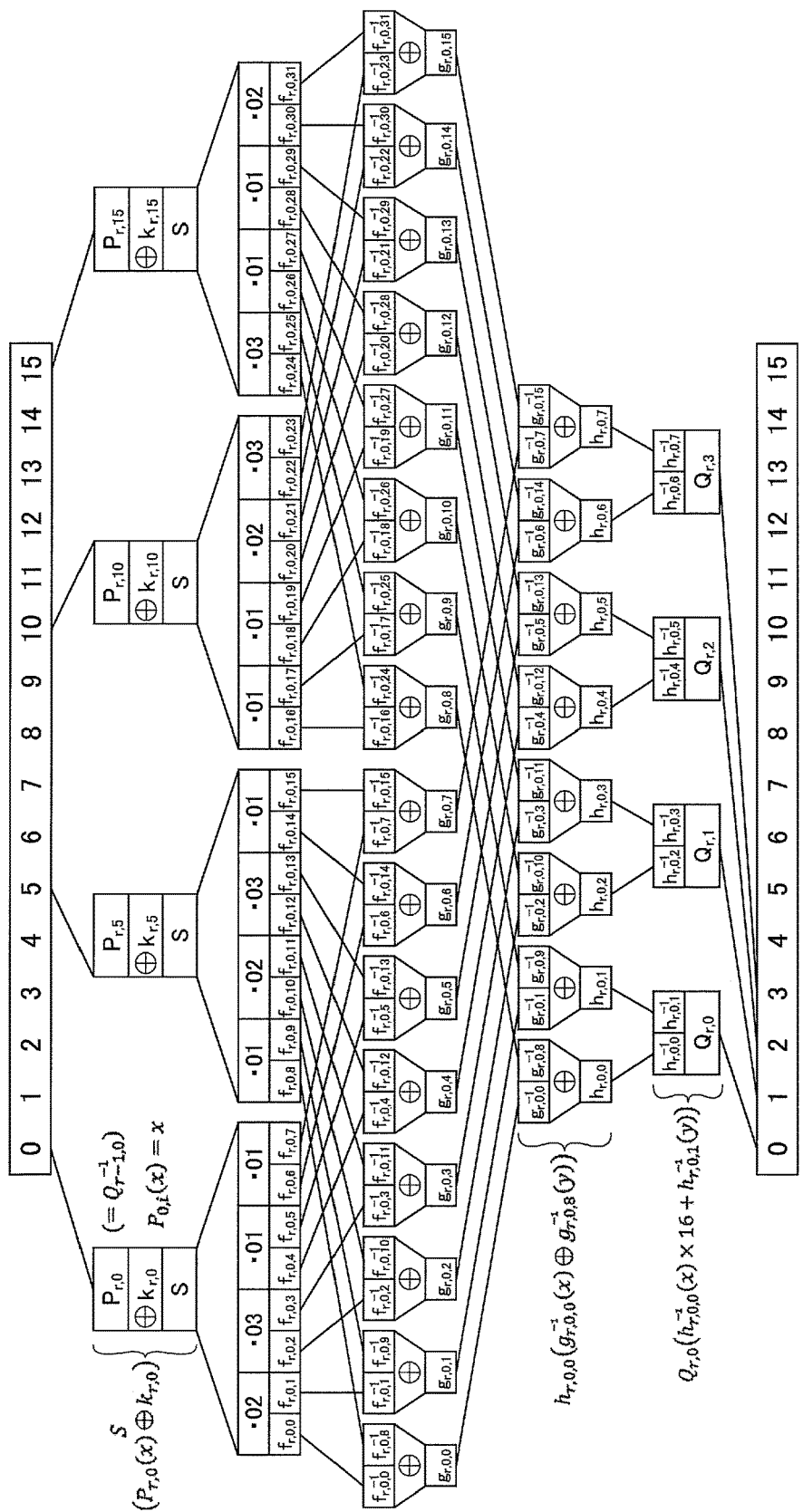
FIG. 12 is a schematic view (No. 2) illustrating an example of a process of 1-round of encryption of the comparative example.

FIG. 12 is a schematic view (No. 2) illustrating an example of a process of 1-round of encryption of the comparative example. The relationship between input and output of the LUT in the sub-round process can be illustrated as FIG. 12. Further, data capacity of the LUT of the comparative example becomes as follows.

FIG. 13 is a table illustrating an example of data capacity of the LUT of the comparative example. As illustrated in FIG. 13, the data capacity differs in accordance with a key length, in other words, the number of rounds to be performed.

If data used in a process of a single round does not contain data of other round as the case of the comparative example, if the relationship between the input and the output is analyzed, even if complicated processes are performed in 1-round, the data may be decrypted.

(3. Example of Functional Structure of Embedded System)

FIG. 14 is a functional block diagram illustrating an example of the embedded system 1 of the embodiment. As illustrated in FIG. 14, the embedded system 1 includes a selector FN1, a converter FN2 and an exclusive OR calculator FN3.

The selector FN1 selects the sub-round data "D_SR", whose size is 4 bytes, from the input data "D_IN". As illustrated in FIG. 3, the input data "D_IN" is 1-round data whose size is 16 bytes. When the sub-round data "D_SR" is selected by the selector FN1, a processed result similar to a processed result obtained by executing a "ShiftRows" function defined by FIPS 197 can be obtained. The selector FN1 is actualized by the arithmetic unit HW1 (FIG. 1) or the like, for example.

The converter FN2 converts each data of 1 byte of the sub-round data "D_SR" based on the table, in which a component of key data prepared for a different round is reflected, to generate the converted data of 4 bytes. It is preferable that table data DT indicating the table "TB" is previously generated by a data processing apparatus that can ensure a sufficient storage area. In many cases, a large amount of a storage area or the like such as a RAM, a stacked memory or the like is necessary for generating the table data DT. Thus, it is preferable that the table data DT is previously generated by a PC or the like that can ensure a sufficient storage area compared with an apparatus such as the embedded system 1 or the like. In other words, the table data DT is previously generated using the key data of the other round D_K that is different from the currently being generated round, and is previously input (stored) in the embedded system 1. The converter FN2 is actualized by the arithmetic unit HW1 (FIG. 1) or the like, for example.

The exclusive OR calculator FN3 calculates exclusive OR of each of the converted data "D_CH". The exclusive OR calculator FN3 is actualized by the arithmetic unit HW1 (FIG. 1) or the like, for example.

When the conversion by the converter FN2 based on the table and the calculation of the exclusive OR by the exclusive OR calculator FN3 are performed, the output is similar to the processed result obtained by performing the functions of "AddRoundKey", "SubBytes" and "MixColumns" defined in FIPS 197.

Further, key data D_K prepared for another round (2nd round, for example) is included as table constituting components of a table used in a certain round (1st round, for example). Thus, even when a relationship between input and output of each round is analyzed by the BGE attack or the like, as it is difficult to analyze the table and the key data, it is difficult to decrypt the encrypted data. Thus, according to the embedded system 1 of the embodiment, data is made difficult to be decrypted.

Further, according to the embodiment, when the key length is 128 bits, the embedded system 1 is configured to use a LUT of 16 k bytes for each 1-round in the first round and the intermediate rounds. Further, the embedded system 1 is configured to use a LUT of 4 k bytes in the final round. Thus, according to the embedded system 1, encryption of AES can be performed with data capacity of "16×9 rounds+4=148 k bytes".

Here, when the key length is 192 bits, 12 rounds are performed, and according to the embedded system 1, encryption of AES can be performed with data capacity of "16×11 round+4=180 k bytes".

Further, when the key length is 256 bits, 14 rounds are performed, and according to the embedded system 1, encryption of AES can be performed with data capacity of "16×13 rounds+4=212 k bytes".

As such, according to the embedded system 1, encryption of AES can be performed with small data capacity.

In particular, as described above in the embodiment, by performing a plurality of calculations by a single LUT, compared with a case when a plurality of calculations are performed, process load can be made small. Thus, it is more preferable for the embedded system or the like to use the conversion by the table such as the LUT or the like.

Further, it is preferable that the embodiment is adapted to an embedded system having a lot of limitations such as usable memory capacity or the like. Further, in order to make the program and the data difficult to be decrypted, as illustrated in FIG. 1, it is desirable that the embedded system 1 has a hardware structure in which the memory is included in the arithmetic unit.

The embedded system 1 is used for a so-called Smart Meter or the like, for example. Further, the Smart Meter or the like often transmits data between external devices. In such a case, the Smart Meter or the like can transmit the data after being encrypted in AES by the embedded system 1. With this, as the transmitted data is encrypted, the Smart Meter can improve the security in transmitting data.

Alternative Examples

The embedded system 1 is not limited to perform encryption in AES. For example, the embedded system 1 may perform decryption by using a process corresponding to an inverse function of each of the above described processes. For example, an inverse function of the "ShiftRows" function is an "InvShiftRows" function or the like. An inverse function of the "SubBytes" function is an "InvSubBytes" function, and an inverse function of the "MixColumns" function is an "InvMixColumns" function.

Although an example in which a single table "TB" (see FIG. 3 or the like, for example) is prepared for each sub-round data is explained in the above embodiment, not all of the plurality of processes may be configured into a single table. For example, as illustrated in FIG. 9, a table may be prepared for each process, or a table may be prepared for each group of two or more processes. In such a case, inversion and conversion are performed between adjacent processes each being configured into different tables.

The embedded system 1 is not limited to the Smart Meter. For example, the embedded system 1 may be a general embedded apparatus, an apparatus that performs a communication with other apparatuses by cloud or the like, a device used for IoT (Internet of Things), a data processing system or the like including one or more of data processing apparatuses of combination thereof, or the like.

The embedded system 1 may not be actualized by a single data processing apparatus. The embedded system 1 may be actualized by a data processing system including two or more data processing apparatuses. In the data processing system, a part of or all of each of the processes may be performed by distribution, redundant, parallel, or a combination thereof.

The embodiment may be actualized by a program for having a computer such as a data processing apparatus, a data processing system or the like execute the data processing method of the embodiment. In other words, the program is a program for having the computer execute the data processing method of the embodiment, and is a computer program described by a programming language or the like.

The program may be stored in a recording medium such as an optical disc such as a DVD, a Blu-ray disc (registered trademark) or the like, a flash memory, a magnetic disc, a magneto-optical disc or the like, and may be provided. Further, the program may be provided through an electrical communication network or the like.

According to the embodiment, it is possible to make data difficult to be decrypted in AES.

Although a preferred embodiment of the data processing apparatus and the data processing method has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

What is claimed is:

1. A data processing apparatus that encrypts or decrypts data by Advanced Encryption Standard in which first key data is prepared for a first round process and second key data is prepared for a second round process, which is performed later than the first round process, the data processing apparatus comprising:
    a memory; and
    a processor that executes a program stored in the memory that causes the processor to perform the first round process by
        selecting sub-round data of 4 bytes from input data that is a process target of the first round process,
        performing redetermined process including an encryption process or a decryption process using at least a part of the second key data prepared for the second round process on the selected sub-round data of 4 bytes, by using a first look up table including values to output a result same as performing the predetermined process, to convert each data of 1 byte of the sub-round data and obtain converted data of 4 bytes, and
        calculating exclusive OR of the converted data of the sub-round data, respectively.

2. The data processing apparatus according to claim 1, wherein the second round process is performed next to the first round process.

3. The data processing apparatus according to claim 2,
    wherein the predetermined process for the first look up table includes a process using a random number component,
    wherein the program stored in the memory further causes the processor to perform the second round process by
        selecting sub-round data of 4 bytes from input data that is a process target of the second round process, and
        performing a second predetermined process including a process using a canceling component that cancels the process using the random number component included in the predetermined process for the first look up table on the selected sub-round data of 4 bytes, by using a second look up table including values to output a result same as performing the second predetermined process, to convert each data of 1 byte of the sub-round data of the second round process and obtain converted data of 4 bytes.

4. The data processing apparatus according to claim 1, wherein the predetermined process includes an encryption process or a decryption process using at least a part of key data prepared for the first round process.

5. The data processing apparatus according to claim 1, wherein by the performing the predetermined process based on the first look up table, a part of the sub-round data is converted to contain a random number component, and a part of the sub-round data is converted to contain a canceling component that cancels the random number component.

6. The data processing apparatus according to claim 1, wherein the data processing apparatus is an embedded system.

7. The data processing apparatus according to claim 1, wherein in the selecting, a processed result similar to a processed result obtained by executing a ShiftRows function is obtained.

8. The data processing apparatus according to claim 1, wherein by the performing the predetermined process based on the first look up table, and the calculating, a processed result similar to a processed result obtained by executing an AddRoundKey function, a SubBytes function and a MixColumns function is obtained.

9. A data processing method performed by a data processing apparatus that encrypts or decrypts data by Advanced Encryption Standard in which first key data is prepared for a first round process and second key data is prepared for a second round process which is performed later than the first round process, comprising:
    performing the first round process by
        selecting sub-round data of 4 bytes from input data that is a process target of the first round process,
        performing a predetermined process including an encryption process or a decryption process using at least a part of the second key data prepared for the second round process on the selected sub-round data of 4 bytes, by using a first look up table including values to output a result same as performing the predetermined process, to convert each data of 1 byte of the sub-round data and obtain converted data of 4 bytes, and
        calculating exclusive OR of the converted data of the sub-round data, respectively.

10. The data processing method according to claim 9, wherein the second round process is performed next to the first round process.

11. The data processing method according to claim 9, wherein the predetermined process includes an encryption process or a decryption process using at least a part of key data prepared for the first round process.

12. A non-transitory computer-readable recording medium having recorded thereon a program that causes a computer, that encrypts or decrypts data by Advanced Encryption Standard in which first key data is prepared for a first round process and second key data is prepared for a second round process which is performed later than the first round process, to execute a data processing method comprising:

performing the first round process by
- selecting sub-round data of 4 bytes from input data that is a process target of the first round process,
- performing a predetermined process including an encryption process or a decryption process using at least a part of the second key data prepared for the second round process on the selected sub-round data of 4 bytes, by using a first look up table including values to output a result same as performing the predetermined process, to convert each data of 1 byte of the sub-round data and obtain converted data of 4 bytes, and
- calculating exclusive OR of the converted data of the sub-round data, respectively.

13. The non-transitory computer-readable recording medium according to claim 12, wherein the second round process is performed next to the first round process.

14. The non-transitory computer-readable recording medium according to claim 12, wherein the predetermined process includes an encryption process or a decryption process using at least a part of key data prepared for the first round process.

\* \* \* \* \*